United States Patent
Houmb

(10) Patent No.: US 10,547,634 B2
(45) Date of Patent: Jan. 28, 2020

(54) NON-INTRUSIVE DIGITAL AGENT FOR BEHAVIORAL MONITORING OF CYBERSECURITY-RELATED EVENTS IN AN INDUSTRIAL CONTROL SYSTEM

(71) Applicant: Secure-NOK AS, Stavanger (NO)

(72) Inventor: Siv Hilde Houmb, Houston, TX (US)

(73) Assignee: SECURE-NOK AS, Stavanger (NO)

( * ) Notice: Subject to any disclaimer, the term of this patent is extended or adjusted under 35 U.S.C. 154(b) by 400 days.

(21) Appl. No.: 15/281,753

(22) Filed: Sep. 30, 2016

(65) Prior Publication Data

US 2017/0093885 A1 Mar. 30, 2017

(30) Foreign Application Priority Data

Sep. 30, 2015 (EP) .................................... 15003001

(51) Int. Cl.
*H04L 29/06* (2006.01)
*G05B 15/02* (2006.01)
*H04W 12/06* (2009.01)

(52) U.S. Cl.
CPC ............ *H04L 63/145* (2013.01); *G05B 15/02* (2013.01); *H04W 12/06* (2013.01)

(58) Field of Classification Search
CPC ........ G06F 21/55; G06F 11/079; H04L 63/02; H04L 63/102; H04W 12/06
USPC .......................................................... 726/24
See application file for complete search history.

(56) References Cited

U.S. PATENT DOCUMENTS

| | | | |
|---|---|---|---|
| 5,655,081 A | 8/1997 | Bonnell et al. | |
| 6,182,249 B1 | 1/2001 | Wookey et al. | |
| 7,085,934 B1 | 8/2006 | Edwards | |
| 7,761,923 B2* | 7/2010 | Khuti | H04L 63/02 726/11 |
| 7,802,301 B1 | 9/2010 | Dreyer et al. | |
| 7,865,888 B1* | 1/2011 | Qureshi | G06F 11/079 717/168 |
| 8,856,936 B2* | 10/2014 | Datta Ray | H04L 63/1433 726/25 |
| 9,697,355 B1* | 7/2017 | Park | G06F 21/552 |

(Continued)

FOREIGN PATENT DOCUMENTS

| | | |
|---|---|---|
| EP | 3065076 A1 | 9/2016 |
| WO | 2000/070463 A1 | 11/2000 |
| WO | 2014/109645 A1 | 7/2014 |

OTHER PUBLICATIONS

European Search Report dated Jan. 25, 2016, for European Application No. 15003001.3 (6 p.).

*Primary Examiner* — Bryan F Wright
(74) *Attorney, Agent, or Firm* — Conley Rose, P.C.

(57) ABSTRACT

There is described a digital agent for monitoring of cybersecurity-related events in an industrial control system. The digital agent being residable in a host. The digital agent includes a module for monitoring behavioral data of the host, such as violation of security policy, system usage metric, etc. The digital agent also includes a module for recording behavior baseline of the host, such as operating system, operating system version, firewall status etc. In addition, the digital agent includes an agent state machine for monitoring the CPU load and/or memory usage of the host. Further, the digital agent includes an agent communication module for transmitting monitored data to an analysis unit external to the industrial control system.

19 Claims, 5 Drawing Sheets

(56) References Cited

U.S. PATENT DOCUMENTS

| | | | |
|---|---|---|---|
| 2005/0015624 A1* | 1/2005 | Ginter | G06F 21/55 726/4 |
| 2006/0117295 A1 | 6/2006 | Wu et al. | |
| 2006/0156380 A1 | 7/2006 | Gladstone et al. | |
| 2007/0113218 A1* | 5/2007 | Nolan | G06F 11/362 717/124 |
| 2007/0226796 A1* | 9/2007 | Gilbert | G06F 21/55 726/22 |
| 2011/0039237 A1* | 2/2011 | Skare | G05B 23/0267 434/118 |
| 2013/0117847 A1* | 5/2013 | Friedman | H04L 63/102 726/22 |
| 2013/0305357 A1* | 11/2013 | Ayyagari | H04W 12/06 726/22 |
| 2014/0130120 A1 | 5/2014 | Bezilla et al. | |

* cited by examiner

NON-INTRUSIVE DIGITAL AGENT FOR BEHAVIORAL MONITORING OF CYBERSECURITY-RELATED EVENTS IN AN INDUSTRIAL CONTROL SYSTEM

CROSS-REFERENCE TO RELATED APPLICATIONS

This application claims priority to European Patent Application No. 15003001.3 filed Sep. 30, 2015, and entitled "Non-Intrusive Software Agent for Monitoring and Detection of Cyber Security Events and Cyber-Attacks in an Industrial Control System," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure is related to cybersecurity in industrial control systems, and in particular to monitoring of cybersecurity threats to industrial control systems.

Operational technology environments are the backbone of a nation's industrial critical infrastructure and contain a myriad of industrial control systems that operate in real-time. Industrial control systems refer to the general class of devices including supervisory control and data acquisition (SCADA) systems, distributed control systems, programmable logic control devices, and single board computers and some combination of these types of equipment. Industrial control systems provide the automation in critical infrastructure assets including the electric power generation, transmission, and distribution; nuclear power plant generation; oil and gas and mining exploration, drilling, production, and transportation; large-scale shipping and transportation whether done by land, sea, or air; large-scale water pumping; and waste water and sewage treatment. Industrial control systems perform functions such as collecting and transmitting data from sensors; opening or closing valves, breakers, or pumps; starting operations of devices or terminating operations of devices; or monitoring the operational technology environment for abnormal conditions to alert the operator and possibly sound alarms.

Digital agents, interchangeably also called logical agents or software agents, are used extensively in all types of computer networked systems, in both information technology and operational technology environments. Typically, these digital agents are categorized as "intelligent" meaning that the digital agent itself performs some level of analysis and makes logic decisions based on algorithms or heuristics. As a result of the analysis and decision making, the digital agents then perform actions to control the net-worked devices. One example is managing equipment, such as disclosed in U.S. Pat. No. 5,655,081 . Because these digital agents perform higher level functions, the digital agents often use an artificial intelligence paradigm in performing that functionality. The data collected by the digital agent may reside within software database digital agents and is not passed in its form as collected outside of the digital agent. Rather, the data is processed by the digital agent itself.

These "intelligent digital agents" inventions function in a number of ways including by inputting and analyzing information by the software in the digital agent using logic trees or a set of rules; by calculating scores or metrics to guide the decisions; or by calculating on and comparing the inputted data to predefined values. Regardless of the functionality of intelligent digital agents, these digital agents have one computational aspect in common: Intelligent digital agents analyze the data within that software on the digital agent requiring the digital agent to have decision power and control within the digital agent to perform some action which alters the computer network system which is why these digital agents are categorized as "intelligent."

Industrial control systems are a special type of networked systems and used in operational technology environments. Digital agents used in industrial control systems perform some level of automation in systems and are used in systems such as manufacturing facilities, power system substations, or chemical processing plants. The digital agents according to the prior art used in these industrial control systems monitor, manage, and control the industrial control systems, such as disclosed in US 20060117295 A1. Often the industrial control system contains digital agents with different, specific functions such as retrieving data, maintaining a localized database, controlling other digital agents, controlling equipment, etc. The overall industrial control system typically comprises networks of these different types of digital agents to create the knowledge used within the system to make decisions.

Within the domain of cybersecurity, intelligent digital agents may be used to detect security alerts, such as disclosed in U.S. Pat. No. 6,182,249 B1,search for network vulnerabilities, such as disclosed in WO 2000070463 A1, by building a complex vulnerability analysis network; or against an established database of existing, static metrics. These digital agents exhibit some level of intelligence and have specialized functions.

Industrial control systems are increasingly the target of cyber-attacks by criminals, terrorists, and hacktivists for their own respective motives to disrupt or threaten to disrupt operations. Nom The current cyber threats to the industrial control systems are the advanced persistent threat (APT) attacks or the "low-and-slow" attacks that escape more conventional methods for detecting cybersecurity attacks such as perimeter security, intrusion detection systems, or virus and malware/spyware removers. However, industrial control systems are also exposed and the target for other cyber-attacks than APTs, both sophisticated and non-sophisticated.

The real-time nature of industrial control systems requires precise synchronization of processes such as reading and transmitting data from sensors, managing the automation process, or performing mechanical or electrical functions based on the current status and state of the industrial control systems. There are two timing issues for any technology inserted into industrial control systems. The timing within industrial control system must be precise within milliseconds and sometimes microseconds. As a consequence, first, monitoring functionality cannot introduce latency or delays into the industrial control system because of the overhead required by the digital agents. This leads to the requirement that the digital agent is non-intrusive and operates in a non-intrusive manner. Cybersecurity technology used to monitor, detect, respond, or remediate a cyber-attack may slow the system down, an unperceivable delay to the human user, but unacceptable in an industrial control system. Latency, no matter how minute in an information technology environment, cannot be tolerated within an operational environment. Secondly, monitoring the system to detect a cyber-attack must not directly interfere with the timing of the control system and possibly risk causing additional damage.

That is, the monitoring functionality cannot arbitrarily interfere with the functionality of the industrial control systems such as turning on or off values, reading from sensors, etc. to the detriment of the industrial control system. Any action by the monitoring system must be carefully planned with a realization of possible consequences when executed in the industrial control systems.

The most effective and sophisticated monitoring and detection functionality is executed by or assisted by software modules that monitor the system continuously to detect anomalous behavior, analyze the data efficiently and effectively, and correlate activities related to anomalous behavior over a time span to detect that a cyber-attack incident is underway or imminent.

Due to the intelligent nature of the digital agents according to the prior art, there is a significant risk that the agent may interfere with processes ongoing in the industrial control system in an unacceptable way or induce unacceptable delays and latencies in the ongoing processes.

BRIEF SUMMARY OF THE DISCLOSURE

It is therefore an object of the invention to provide an agent and a system for monitoring an industrial control system without interfering with ongoing processes.

The invention is generally directed to remedying or to reducing at least one of the drawbacks of the prior art, or to at least providing a useful alternative to the prior art.

The object is achieved through features, which are specified in the description below and in the claims that follow.

The invention is defined by the independent patent claims. The dependent claims define advantageous embodiments of the invention.

The paradigm behind this invention rests on the observation that successfully countering APT attacks, and other security-related attacks, requires collecting behavior directly on the attacked devices and analyzing this data externally from the agent. The data may be analyzed in its totality by analyzing the data from a plurality of digital agents, and even comparing data across different industrial control systems.

An agent according to the present invention incorporates features that circumvent at least two aspects of the industrial control environments according to the prior art that limit the efficacy of solutions; namely that the agents according to prior art introduces either system overhead, in terms of computational processing time or resources, or timing issues into the industrial control system.

In a first aspect the invention relates to a digital agent for monitoring of cybersecurity-related events in an industrial control system, said digital agent being residable in a host and comprising:
 a module for monitoring behavioral data of said host, such as violation of security policy, system usage metric, etc.
 a module for recording behavior baseline of said host, such as operating system, operating system version, firewall status, etc.
 an agent state machine module for monitoring the CPU load and/or memory usage of said host; and
 an agent communication module for transmitting monitored data to an analysis unit external to the industrial control system.

In a second aspect, the invention relates to a system for monitoring of cybersecurity-related events in an industrial control system said system comprising:
 one or more digital agents according to the first aspect of the invention;
 one or more hosts wherein said one or more agents reside; and
 an analysis unit, external from said industrial control system, adapted to receive data transmitted from said digital agent(s) and to analyse said transmitted data.

In a third aspect, the invention relates to a method for operating a digital agent according to the first aspect of the invention, the method comprising the steps of:
(a) monitoring behavioral data;
(b) monitoring behavioral baseline recordings; and
(c) verifying if either of step (a) or step (b) imposes a load on the host that is above a predetermined threshold.

Finally, in a fourth aspect the invention relates to a computer program for executing the method according to the third aspect of the invention. The computer program may be running on one or multiple pieces of hardware, virtual machines (VMs), or similar.

It should be noted that the agent, system and method according to the present invention, may be a part of a larger system and a method for monitoring an industrial control system as disclosed in WO 2014/109645 which hereby is incorporated to the present description by reference. How to actually respond to a detected cyberattack was disclosed in European Patent Application 15157569.3 which is also hereby incorporated by reference to the present description.

In contrast to cybersecurity industrial monitoring systems according to the prior art, a system according to the present invention utilizes one or more digital agents that do not perform any higher level functionality other than collecting, storing, and sending data. The benefits of this are enormous for the industrial control system industry. Many industrial control systems are legacy systems that may be decades old and once placed into operation, may not be maintained or updated. Because the functionality of the digital agent is streamlined and performs no analysis, the invention digital agents could be installed within the industrial control system and would never require maintenance because the intelligence would never need to be updated because all intelligence needing to be updated is located in an analysis unit, external to the agent and potentially also external to the industrial control system itself. Any changes in the functionality for the analysis to incorporate new technologies or emerging cybersecurity domain knowledge may be performed by the external analysis unit, outside of the industrial control system, meaning that the analysis unit may not be embedded into the industrial control system and may operate separately from the core industrial control functions and not necessarily the actual physical location.

An agent according to the present invention has two main functions:
(1) collecting data from the device/host; and
(2) transmitting that data out of the industrial control system.

The data collection performed by the non-intrusive digital agent is believed to be novel at least because it conducts deep monitoring of the system, collecting data on certain behaviors within the device, such as CPU usage and out of range i/o operations. Because the digital agent according to the invention is limited to data collection, by design the digital agent lacks capability for analysis and executes only the minimal computational functioning or processing by the digital agent. As such, it may be described as a non-intelligent agent. Once the digital agent collects the data on the assigned CPU, it transmits that data to the analysis unit external to the industrial control system for analysis and decision making. The unique aspects of the agent according to the invention are thus believed to be e.g., using simple, non-intrusive digital agents that monitors and collects data and transmits the collected data to the external analysis unit. In addition, the system may incorporate a mechanism for a graceful fallback in case the digital agent exceeds a certain threshold limit in generating too much overhead in the system. The system according to the second aspect of the present invention comprises two main components, one of which is the non-intrusive digital agent according to the first aspect of the invention and the host within which it resides. In addition, the system comprises an analysis unit that will be discussed in further detail below. The non-intrusive digital agents are localized digital agents on each connected processing unit, such as programmable logic control devices, single board computers, virtual machines, routers etc., in the industrial control system. Said non-intrusive agents collect data relative to the behavior of that connected processing unit as discussed above. The collected data is passed to the external analysis unit, a computer system preferably located outside of the industrial control system, for analysis and decision making. The digital agent is non-intrusive because it creates no significant system overhead or interferes with the timing constraints of the industrial control system. The digital agent is not "intelligent" in that it performs no reasoning and makes no decisions on the data it collects. Any higher level computational functionality is performed by the external analysis unit and not on the localized digital agents.

The non-intrusive digital agent according to the first aspect of the invention may in one embodiment comprise the following modules:
(1.1) Behavioral data monitoring module;
(1.2) Behavior baseline recording module;
(1.3) Agent state machine module;
(1.4 Communication module; and
(1.5) Offline storage module, all of which will be described in the following.

1.1 Behavioral Data Monitoring Module

The digital agents collect data that may be indicative of anomalous behavior in the system. Examples of anomalous behavior may be a violation of a security policy, such as not to connect certain devices on the network, or a system usage metric that is not within its expected bounds, such as a significant and unexplainable spike in either CPU usage or access to the hard drive. This anomalous behavior may be part of a larger pattern or attack sequence that includes a series of seemingly innocuous activities that when analyzed in their totality indicate that a cyber-attacker is performing some activity, such as espionage, testing, infiltration of malware, exfiltration of data, before launching the intended full-scale attack. That knowledge can be detected and is beneficial to the responding to the cyber-attack. A non-intrusive digital agent according to the invention collects the data and transmits it to a computer system, an analysis unit, separate from the industrial control system for the analysis.

The digital agent resides in a monitored component/host/device. The agent is non-intrusive and reports behavior and conditions that could indicate the presence of a cyber-attack. The external analysis unit resides outside of the industrial control system; usually on a dedicated component (hardware or virtual machine) within the monitored network or associated networks; and collects and stores information reported by local digital agents as will be described in the following.

The digital agents installed in network nodes or other system entities within the industrial control network and other relevant network segments, monitor their host local activity and report events that may be part of a wider cyber security attack on the network. Monitoring the behavioral data by the behavioral data monitoring module may include reading the behavioral data from the host and writing the behavioral data to memory locations of the host. Such events include activities defined as unexpected by the digital agent configuration and potential attack-related events such as, for example: (1) insertions and removal of host local connected equipment (e.g., USB stick, keyboard, mouse etc.); (2) activation and deactivation of processes within the monitored host; (3) activation and deactivation of host local anti-virus and firewall; (4) excessive or unexpected processor load and memory utilization combined with unexpected open ports within the monitored host; and/or (5) unexpected versions of host local operating systems and anti-virus versions or other software.

1.2 Behavior Baseline Recording Module

Within the digital agent is the functionality to identify and record the digital agent environment, i.e., the monitored host/device, including one or more of the following: (1) operating system (e.g., Debian Linux); (2) operating system version or release identifier; (3) current status of the firewall (enabled/disabled) if one exists on the monitored host; (4) current rules specified in the firewall if one exists on the monitored host; (5) current status of anti-virus protection; (6) list of names and process identifiers (PIDs) of all processes running in the monitored system and their memory usage; (7) list of all Internet Protocol (IP) ports opened on the monitored host; (7) the contents of the digital agent's configuration file; and/or (8) list of all activities in the memory. Recording behavior baseline of the host by the behavior baseline recording module may include reading behavioral baseline data from the host and writing the behavioral baseline data to memory locations of the host.

1.3 Agent State Machine Module

If the CPU load and/or memory usage in the monitored host processor exceeds a configurable, usually high, limit, the digital agent will enter a graceful fallback to a "degraded mode" during which it will monitor only CPU load and/or memory usage without reporting/transmitting data until one or both measurements fall below their target limits again. During this period, the measurement of CPU load and/or memory usage may be carried out less frequently than in normal operation. A minimum message header may be transmitted to the external analysis unit at configurable intervals as an indication that the digital agent is operational during this period. Monitoring CPU load and/or memory usage by the agent state machine module may include periodically reading a value of CPU load and/or memory usage from the host and writing the value to memory of the host.

The USB device and keyboard/mouse events (i.e., non-USB), may be included in the digital agent configuration to allow for deactivation for instance to avoid a digital agent using host resources to check connection points not present on the host, e.g., to check for non-USB connections on a single-board computer without such connectors. Definition of CPU and memory threshold that industrial control systems exceeded/normal events are configurable since it may be individual for each monitored host what is considered "normal" for the host during normal operation. If any of the thresholds are exceeded, the digital agent goes into the "degraded mode" and only monitors CPU and/or memory use without reporting anything until it can report load level back to normal, i.e., below threshold. This is to prevent, as far as practically possible, that the digital agent contributes to the load issue. The digital agent load defined threshold ensures that if a digital agent utilize CPU load above a defined threshold from the monitored host, the digital agent is deemed compromised and will shut itself down to avoid adverse effects towards the operational monitored host. Critical processes may be different between hosts and are configured individually for each digital agent. When the list contains processes, the ability to generate events for start/termination of critical processes is also active. Digital agent alive and identifier messages are used to determine the security status of the monitored host and the status of component connectivity.

To switch from one operating mode to another, the agent state machine module may read the CPU loading and/or memory usage values from memory and compare the values against pre-defined limits for the host (e.g., the agent may include a configuration file that specifies upper limits for CPU and memory loading). Operating modes are defined as: normal, minimum and degraded mode as described herein. Discovery mode is used for "learning" the behavior of the host, which means establishing behavioral baseline as described herein. If comparison of CPU loading and/or memory usage values indicate that the loading is below the limits, then the agent state machine module may maintain a current state if the agent is running in normal or minimum mode, or, if the agent is running in degraded mode, the agent state machine module may transition the agent to normal or minimum mode. The agent state machine module includes memory, so the agent state machine "knows" whether to transition to normal or minimum mode. By changing operating modes responsive to host loading the non-intrusiveness of the digital agent may be maintained.

Herein the phrase "non-intrusive agent" shall be defined as an agent NOT possessing or generating load on the monitored host and network that affects the operational behavior of the industrial control system, that is, the delicate timing requirements as an industrial control system is a real-time system. For example: assuming a monitoring host, such as a controller, taking part in a process requiring real-time processing of instructions. In the example, for the controller to operate normally, the total CPU load must be under 95%. If the controller is running at 90%, the agent cannot affect the processing by more than 3%, preferably not more than 2% to not cause a degradation of the system. Tests have been run that show that the agent load on CPU is less than 2% of the total available CPU capacity and even down to 1% according on newer equipment. The agent load on memory has been shown to be less than 1 MB in some embodiments, though in other embodiment the load was more than 1 MB. It should be emphasized that this is just one specific example, and that a person skilled in the art, once presented with the functional definition, would be able to understand the necessary requirements for an agent to be operating non-intrusively in a variety of different embodiments.

In addition to the digital agent event configuration outlined above, digital agent baseline behavior recording performed by the digital agent on the monitored host system on regular timed basis may collect and transmit additional information to the external analysis unit.

The digital agent may operate in a plurality of modes depending on the situation in the monitored host. In one embodiment the digital agent may operate in four different modes: (1) minimum operating mode, (2) normal operating mode, (3) degraded mode, and (4) discovery mode as will be described in the following.

Minimum operating mode: Where the digital agent only performs a subset of the behavioral monitoring, such as checking for the presence or insertion of a USB stick and/or memory and/or CPU usage. That is, the digital agent only performs a subset of the behavioral monitoring of the normal operating mode.

Normal operating mode: Where the digital agent performs behavioral monitoring according to the defined monitoring configuration for the specific digital agent.

Degraded mode: This mode is enabled when some performance parameters on the monitored host passes specific thresholds as described above, such as CPU load and/or memory usage above a predefined threshold. In most cases in a degraded mode the agent only checks CPU and memory usage, and will return to normal mode whenever the parameters are below the threshold again.

In the degraded mode, the agent only performs the absolute necessary basic functionality to determine if the monitoring can be returned to either the normal operating mode or the minimum operating mode. There may be number of possible degraded modes depending on the various thresholds of the monitored parameters. Graceful fall-back refers to how the system moves to degraded mode without disrupting the system.

Discovery mode: In the discovery mode, the baseline behavior of the monitored host is captured when the agent records the install base and performance data (base-line behavior) on the monitored host. This baseline behavior includes parameters such as the operating system and its patch level, the applications installed and running and their CPU and memory usage, etc. This is used for the baseline behavioral analysis in the external analysis unit. The agent state machine module may transition to discovery mode on initialization of the digital agent or at times when baseline behavior is to be re-established.

1.4 Communication Module

In the communication module, data associated with each monitored event and each baseline behavior recording is converted to a format suitable for transmission to the external analysis unit and then sent via a secure link or communicated using some other means, such as offline communication where data is extracted to an external device and then imported into the external analysis unit. Sending monitored data to the external analysis unit by the communication module may include reading behavioral data and/or behavior baseline data from the memory locations to which the data was written by the behavioral data monitoring module and/or the behavior baseline recording module, formatting the data for transmission, writing the formatted data to a transmit buffer in the host memory, and triggering a network adapter or other communication device to read the data from the transmit buffer and transmit the data.

1.5 Offline Storage Module

In cases where the network bandwidth is limited or where there are needs for offline communication means, monitored data and behavioral recordings may be stored locally on the monitored host.

A system according to the second aspect of the present invention comprises both an agent according to the first aspect of the invention, a host in which the agent resides as well as an analysis unit external to the industrial control system.

The external analysis unit may in one embodiment include one or more of the following modules:
2.1 Communication module;
2.2 Baseline behavior analysis module;
2.3 Agent status module; and
2.4 Security analysis module, all of which will be described in the following.

2.1 Communication Module

In the communication module, data received from a digital agent may be categorized as either a security event or a behavioral recording and each is analyzed to determine: (1) that it has arrived from a valid digital agent, and (2) that it is in a readable and valid form. To receive data to be analyzed, the analysis unit (i.e., the communication module described above) may read data from a receive buffer in which the data was stored by a network adapter or other communication interface that received the data from the digital agent. Analysis of the received data may be provided by any number of analysis modules. For example, the analysis unit may include a baseline analysis module and a security analysis module. The behavior baseline and behavior data may be identified by identification values in the received data. Accordingly, the communication module may compare the identification values received with the transmitted data to predetermined security and baseline behavior values to determine whether a received value corresponds to a security event or a behavioral recording. The validity of the received data is determined by first evaluating whether the data is in a valid form and then evaluating whether the data was received from a valid digital agent. The evaluation of whether the data is in a valid form is performed by a component of the analysis unit that has knowledge of what constitutes valid form. A component of the analysis unit then evaluates whether the identification information included with the data is accurate and from a valid digital agent. For example, some embodiments use digital certificates and the analysis unit evaluates the validity of the digital certificate. Some embodiments may provide other identification data or forms that are used in the evaluation of whether the data is from a valid digital agent.

The data received on each digital agent behavioral recordings report and each digital agent security event report is stored in an external analysis unit database. A behavioral recording may contain some or all of the following information: (1) operating system name; (2) operating system version; (3) anti-virus (AV) digital identity; (4) AV pattern version; (5) firewall status (enabled/disabled); (6) firewall rules including a list of all IP ports opened on the monitored device; (7) list of all processes running in the monitored device; (8) contents of the digital agent's configuration file.

2.2 Baseline Behavior Analysis Module

In the baseline behavior analysis module, the external analysis unit may perform a number of analyses on the received behavioral recordings from the digital agents, including analysis on potential deviations in the list of applications running on the associated monitored host and whether anti-virus software or operating system are up to date. The baseline behavior analysis module reads the behavioral baseline data from memory and evaluates whether the recorded data represent an abnormal or "normal" behavior and thereafter may update the behavioral baseline stored for the host in an associated database (e.g., if the data is determined to represent normal behavior).

2.3 Agent Status Module

In the agent status module, the external analysis unit may maintain a configurable watchdog timer for each digital agent that reports to it. The timer is started when either the analysis unit or the digital agent is initiated and reset whenever the analysis unit receives data from the digital agent. If the timer expires, a digital agent lost event is generated by the analysis unit, stored in the analysis unit databases and distributed to relevant entities within the external analysis unit.

2.4 Security Analysis Module

In the security analysis module the external analysis unit may read behavior data from memory and perform a number of security analyses, including virus, malware and spyware analysis to detect whether there is a potential cyberattack on any of the monitored hosts. Reference is also made to the above-mentioned WO 2014/109645.

BRIEF DESCRIPTION OF THE DRAWINGS

In the following is described an example of a preferred embodiment illustrated in the accompanying drawings, wherein.

DETAILED DESCRIPTION OF THE PREFERRED EMBODIMENTS

Figure 1:
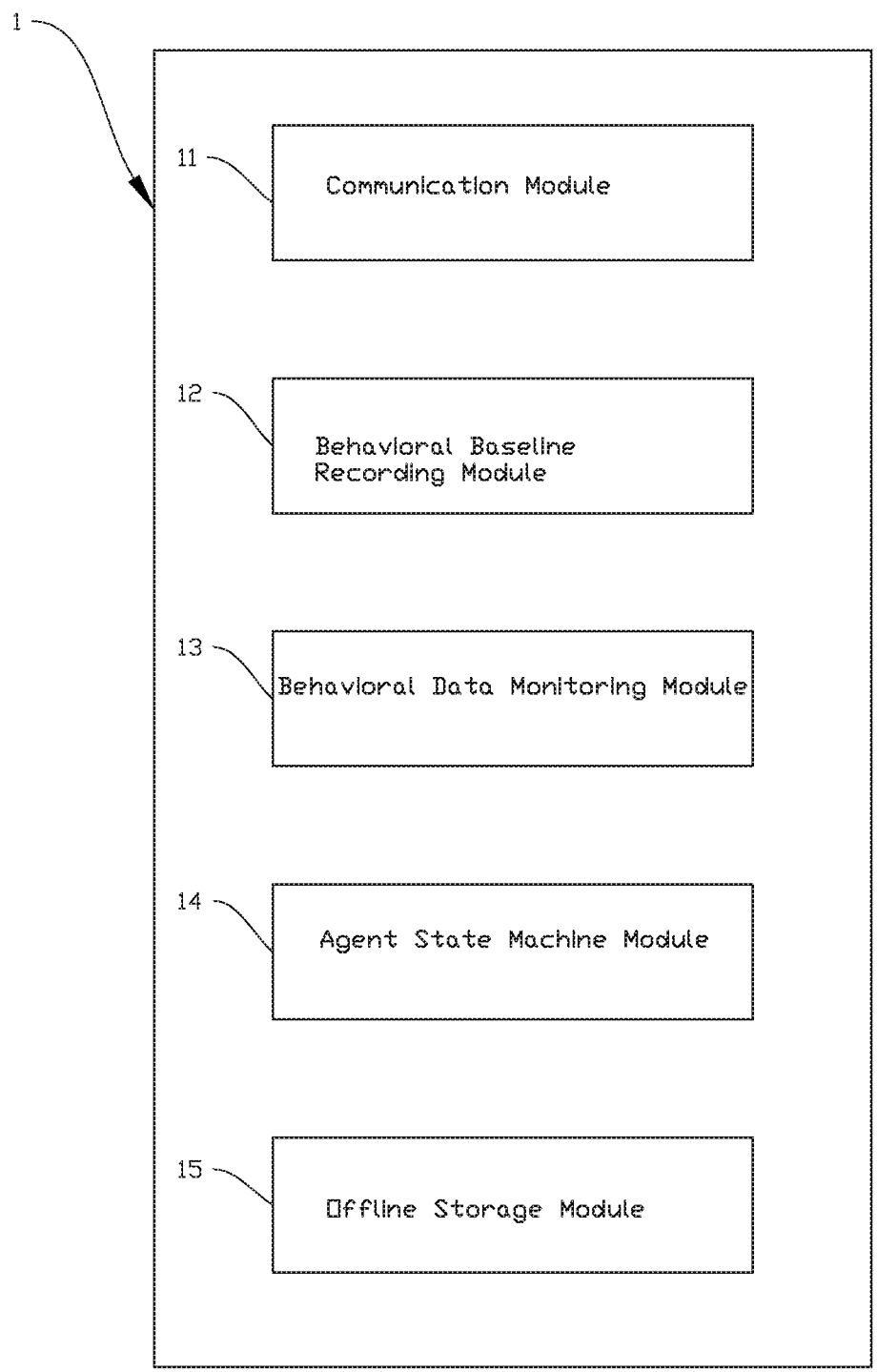
FIG. 1 shows an agent according to the first aspect of the invention.

In the following the reference numeral 1 will indicate an agent according to the first aspect of the invention, whereas the reference numeral 10 indicates a system according to the second aspect of the invention. The figures are shown simplified and schematic.

FIG. 1 shows an agent 1 according to the first aspect of the invention. In the shown embodiment, the agent comprises a communication module 11, a behavioral baseline recording module 12, a behavioral data monitoring module 13, an agent state machine module 14 and an offline storage module 15, all of which were discussed above. The agent 1 resides in a not shown host in a not shown industrial control system.

Figure 2:
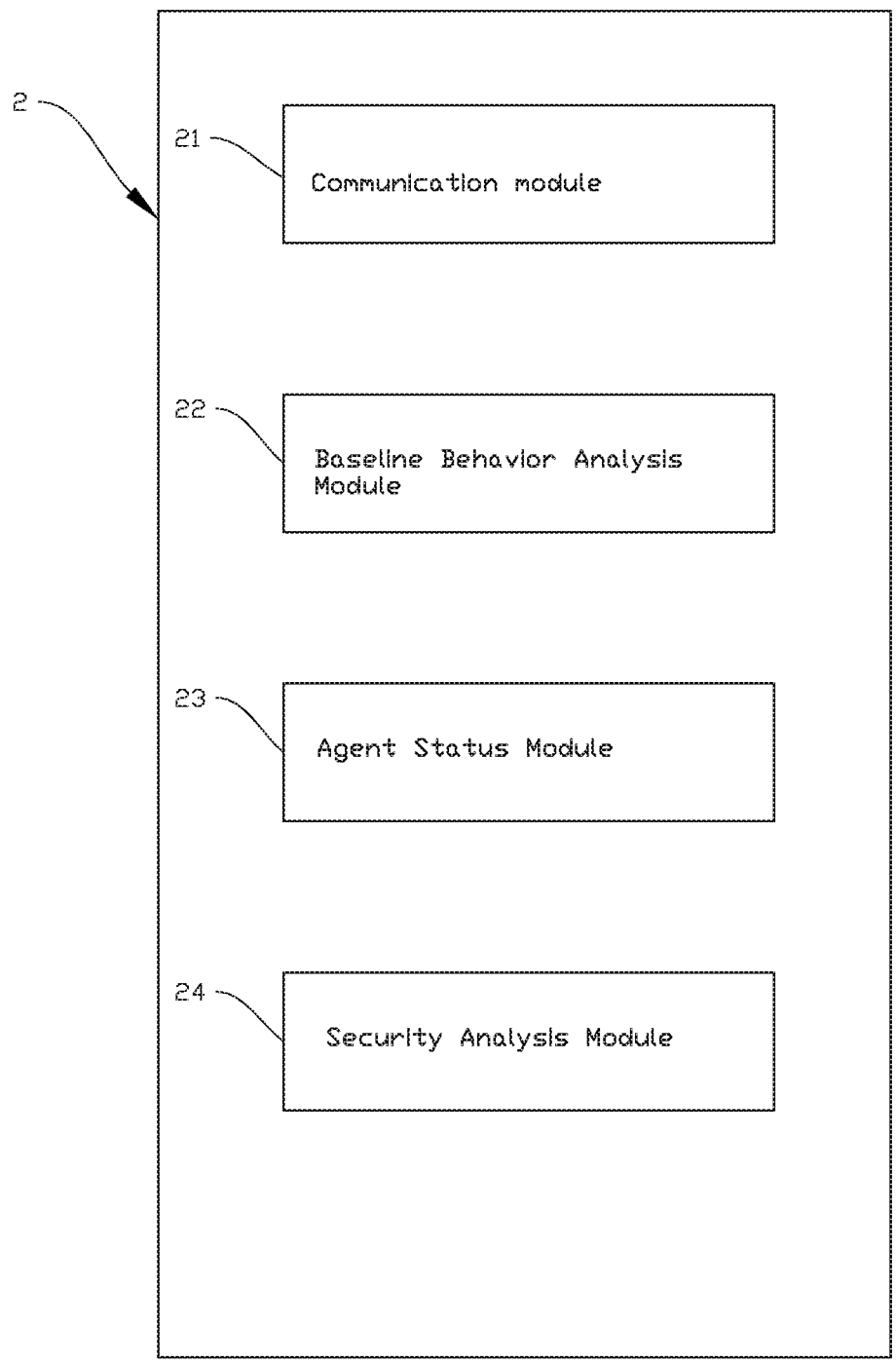
FIG. 2 shows an analysis unit external to the industrial control system.

FIG. 2 shows an analysis unit 2 external to the not shown industrial control system. In the shown embodiment, the analysis unit comprises a communication module 21, a baseline behavior analysis module 22, an agent status module 23 and a security analysis module 24, all of which were discussed above.

Figure 3:
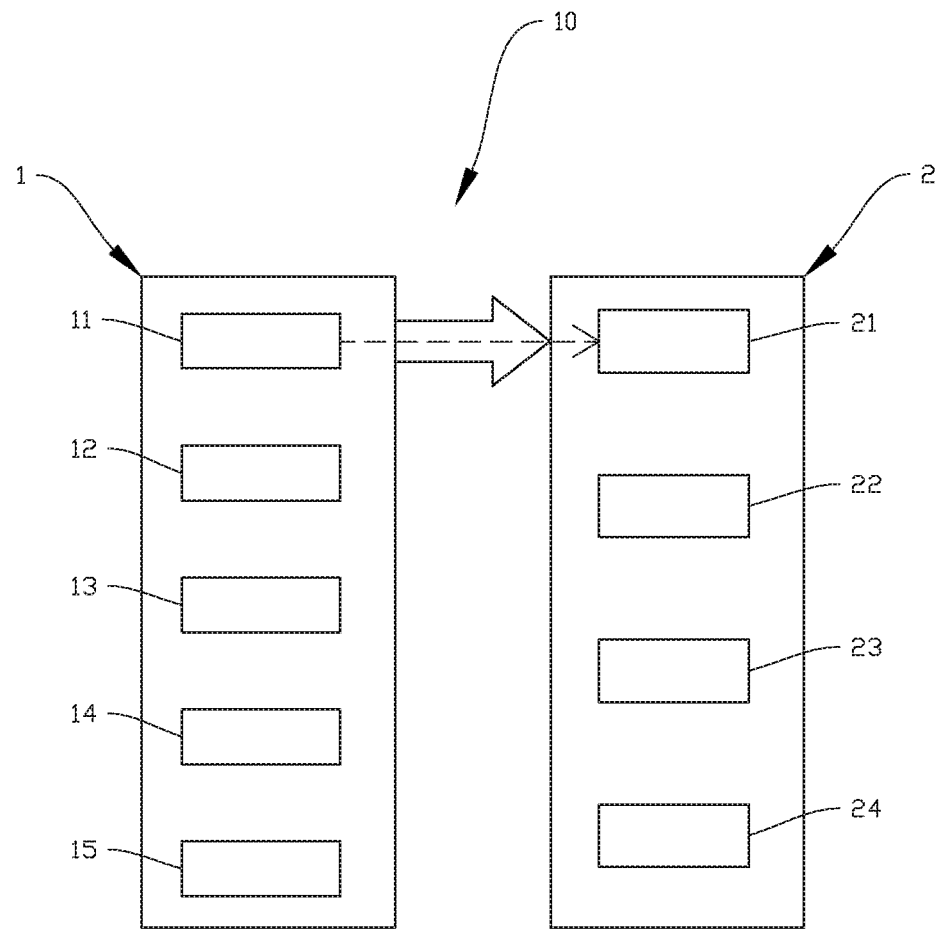
FIG. 3 shows a system according to the second aspect of the invention.

The analysis unit 2 is adapted to receive data from the agent 1 by the agent communication module 11 transmitting data to the analysis unit communication module 21 as indicated in FIG. 3. The agent 1, the analysis unit 2 and the not shown host are included in a system 10 according to the second aspect of the invention.

Figure 4A:
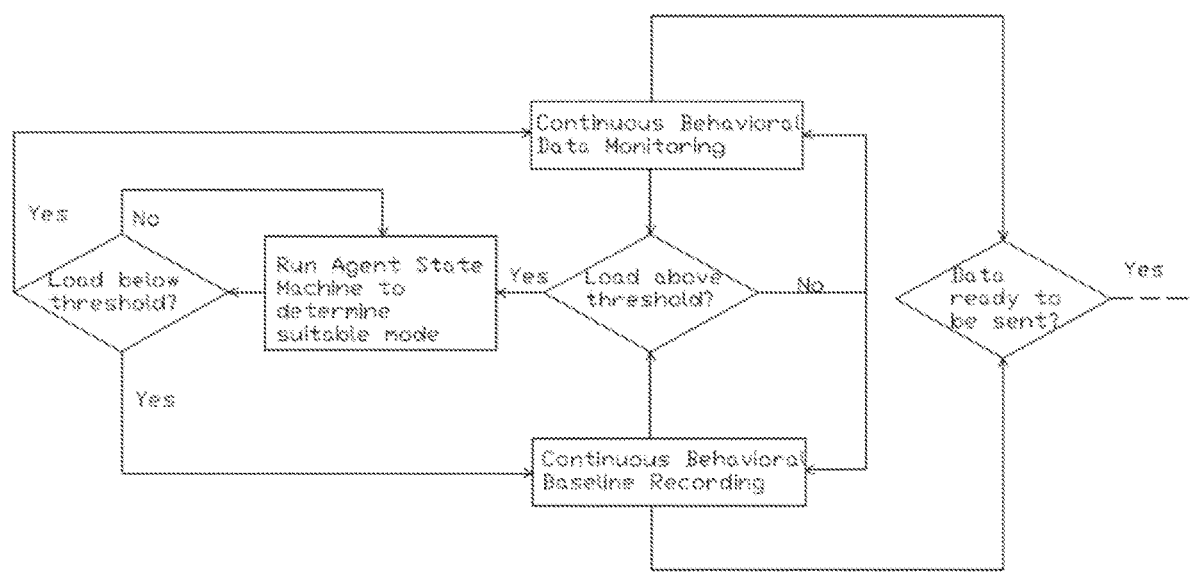
FIGS. 4a-b show a flow diagram representing a cybersecurity monitoring process in an agent according to an embodiment described herein.
Figure 4B:
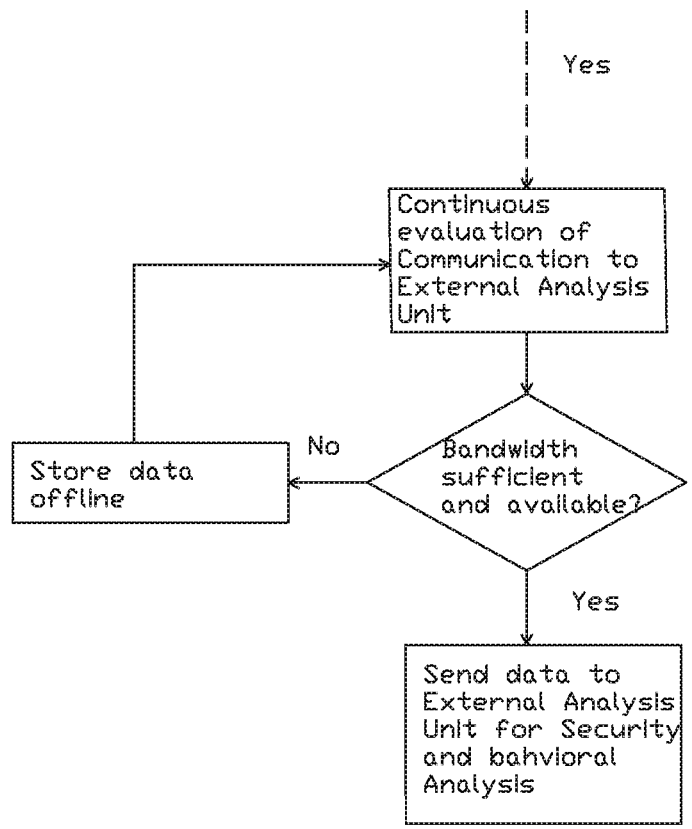

FIGS. 4a and 4b show a typical workflow in an agent 1 according to the first aspect of the present invention, wherein FIG. 4a shows the internal agent workflow and FIG. 4b shows the workflow regarding communication between the agent and the external analysis unit.

As shown in FIG. 4a, the agent state machine is the entity that keeps track of the state of the monitored host and determines whether the monitored host is operating below or above a predefined threshold. This threshold is configurable, but most often associated with CPU load and memory usage. An example threshold could be 95% of CPU load and Memory usage. There might also be other parameters as part of the threshold definition. In case the monitored host is operating below the threshold, the agent is performing continuous behavior baseline recording and performing continuous behavioral monitoring. If the monitored host is operating at a level above the predefined threshold, the agent only monitors the predefined threshold parameters, such as CPU load and Memory usage. In case the load is below the threshold, the agent is recording data, and there is sufficient and/or available bandwidth or communication link, the data is sent from the agent to the external analysis unit as indicated by the dotted line. To determine whether data is ready to be sent to the analysis unit, the digital agent may access a configuration file or other transmission parameter source that specifies the frequency at which data should be sent, minimum size of data to be sent, etc. to the analysis unit. The digital agent may also evaluate the format of the data and determine whether the timing and stored data meet the transmission parameters.

FIG. 4b shows an example workflow for sending data from the agent to the external analysis unit. The dotted lines in FIGS. 4a and 4b are meant to be connected and indicate the connections between the workflows shown in the two figures. In the example, whenever there are data to be sent, the agent will evaluate whether there is sufficient or available bandwidth and only send data if that is the case. In case of non-sufficient bandwidth, the data will not be sent but be stored offline. Sufficient bandwidth may be related to the size of the data to be sent and may vary from system to system. Sufficient bandwidth may be defined such that the data to be sent does not cause delay of the real-time transmission required by the industrial control system (ICS) to execute its operations. For example, for a resource constrained ICS, the data may be split into multiple transmissions to ensure that the load on the network doesn't affect the operations of the ICS.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The method according to the invention may be implemented by means of hardware comprising several distinct elements, and by means of a suitably programmed computer. In the device claim enumerating several means, several of these means may be embodied by one and the same item of hardware.

What is claimed is:

1. A digital agent for monitoring cybersecurity-related events in an industrial control system, the digital agent being residable in a host and comprising:
   a memory comprising instructions;
   a processor coupled to the memory and configured to execute the instructions, which causes the processor to be configured to:
   operate in a plurality of modes depending on a security status of the host monitored by the digital agent and a status of component connectivity;
   monitor behavioral data of the host when the digital agent is operating in a normal mode, wherein the behavioral data comprises at least one of violation of security policy data or system usage metric data;
   record a behavioral baseline of the host when the digital agent is operating in a discovery mode, wherein the behavioral baseline comprises at least one of an operating system identification, an operating system version, a firewall status, or an antivirus status;
   monitor, when the digital agent is operating in a degraded mode or a minimum operating mode, at least one of a central processing unit (CPU) load or memory usage of the host; and
   transmit monitored data to an analysis device external to the industrial control system, wherein the analysis device validates the digital agent and a form of the monitored data.

2. The digital agent of claim 1, wherein the digital agent further comprises an offline memory storage.

3. The digital agent of claim 1, wherein the processor is further configured to switch between the plurality of modes of the digital agent based on the CPU load or the memory usage of the host.

4. The digital agent of claim 3, wherein the processor is further configured to switch between:
   the normal mode or the minimum operating mode when the CPU load or the memory usage is below a predetermined threshold; and
   the degraded mode when the CPU load or the memory usage is above the predetermined threshold.

5. The digital agent of claim 4, wherein the normal mode or the minimum operating mode of the digital agent is configured to occupy:
   5% or less of an available CPU load or an available memory usage of the host;
   3% or less of the available CPU load or the available memory usage of the host; or
   2% or less of the available CPU load or the available memory usage of the host.

6. A system for monitoring cybersecurity-related events in an industrial control system, the system comprising:
   one or more digital agents, wherein the one or more digital agents each comprising a memory and a processor configured to: operate in a plurality of modes depending on a security status of a host monitored by the digital agent and status of component connectivity;
   monitor behavioral data comprise at least one of violation of security policy data or a system usage metric data;
   record a behavioral baseline of the host when the digital agent is operating in a discovery mode, wherein the behavioral baseline comprise at least one of an operating system identification, an operating system version, a firewall status, or an antivirus status;
   monitor, when the digital agent is operating in a degraded mode or a minimum operating mode, at least one of a central processing load (CPU) load or memory usage of the host; and
   transmit monitored data to an analysis device;
   wherein the one or more digital agents reside in the host; and wherein the analysis device is disposed external from the industrial control and comprises:
   a receiver configured to receive the monitored data transmitted from the digital agents; and
   a processor coupled to the receiver and configured to validate the digital agents and a form of the monitored data.

7. The system of claim 6, wherein the analysis device further comprises a processor configured to categorize the monitored data either as a security event or as a behavioral recording.

8. The system of claim 6, wherein the analysis device further comprises a processor configured to analyse the behavioral baseline from the digital agent.

9. The system of claim 6, wherein the analysis device further comprises a processor configured to record security events from the digital agent.

10. The system of claim 6, wherein the analysis device further comprises a processor configured to execute a configurable timer that is started when the analysis device or the digital agent is initiated and reset when the analysis device receives monitored data from the digital agent.

11. A method for operating a digital agent implemented in an industrial control system, the method comprising:
    operating the digital agent in a plurality of modes depending on a security status of a host monitored by the digital agent and a status of component connectivity;
    monitoring behavioral data of the host when the digital agent is operating in a normal mode, wherein the behavioral data comprises at least one of violation of security policy data or system usage metric data;
    recording a behavioral baseline of the host when the digital agent is operating in a discovery mode, wherein the behavioral baseline comprises at least one of an operating system identification, an operating system version, a firewall status, or an antivirus status;
    monitoring, when the digital agent is operating in a degraded mode or a minimum operating mode, at least one of a central processing unit (CPU) load or memory usage of the host;
    determining whether either of monitoring the behavioral data or recording the behavioral baseline imposes a load on the host that is above a predetermined threshold; and
    sending the behavioral data and the behavioral baseline to an analysis device external to the industrial control system, wherein the analysis device validates the digital agent and a form of the behavioural data.

12. The method of claim 11, further comprising verifying whether the behavioral data or the behavioral baseline is ready to be sent to the analysis device.

13. The method of claim 12, further comprising sending the behavioral data and the behavioral baseline to the analysis device in response to a sufficient bandwidth being present on a link between the digital agent and the analysis device.

14. The method of claim 12, further comprising storing the behavioral data and the behavioral baseline locally on the digital agent.

15. The method of claim 11, wherein the method further includes, based on a determination that either monitoring the behavioral data or recording the behavioral baseline imposes the load on the host that is above the predetermined threshold, determining the degraded mode of operation for the digital agent.

16. A non-transitory computer readable medium encoded with instructions that when executed cause a computer implemented in an industrial control system to:
    operate in a plurality of modes depending on a security status of a host monitored by a digital agent and a status of component connectivity;
    monitor behavioral data of the host when the digital agent is operating in a normal mode, wherein the behavioral data comprises at least one of violation of security policy data or system usage metric data;
    record a behavioral baseline of the host when the digital agent is operating in a discovery mode, wherein the behavioral baseline comprises at least one of an operating system identification, an operating system version, a firewall status, or an antivirus status;
    monitor, when the digital agent is operating in a degraded mode or a minimum operating mode, at least one of a central processing unit (CPU) load or memory usage of the host;
    determine whether either monitoring the behavioral data or recording the behavioral baseline imposes a load on the host that is above a predetermined threshold; and
    send the behavioral data and the behavioral baseline to an analysis device external to the industrial control system, wherein the analysis device validates the digital agent and a form of the behavioural data.

17. The non-transitory computer readable medium of claim 16, wherein the behavioral data and behavioral baseline is sent to the analysis device in response to a sufficient bandwidth being present on a link between the digital agent and the analysis device.

18. The non-transitory computer readable medium of claim 16, wherein the instructions, when executed, further cause the computer to store the behavioral data and the behavioral baseline locally on the digital agent.

19. The non-transitory computer readable medium of claim 16, wherein the instructions, when executed, further cause the computer to determine the degraded mode of operation for the digital agent based on a determination that either monitoring the behavioral data or recording the behavioral baseline imposes the load on the host that is above the predetermined threshold.

* * * * *